US007908412B2

(12) United States Patent
Vega-Garcia

(10) Patent No.: US 7,908,412 B2
(45) Date of Patent: Mar. 15, 2011

(54) BUFFER PASSING MECHANISMS

(75) Inventor: Andres Vega-Garcia, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 11/382,524

(22) Filed: May 10, 2006

(65) Prior Publication Data

US 2007/0282862 A1 Dec. 6, 2007

(51) Int. Cl.
*G06F 15/173* (2006.01)
(52) U.S. Cl. ........................................................ 710/52
(58) Field of Classification Search .................... 710/52; 709/231
See application file for complete search history.

(56) References Cited

U.S. PATENT DOCUMENTS

| 5,373,470 | A | * | 12/1994 | Jones, Jr. ................. 365/189.05 |
| 5,675,793 | A | * | 10/1997 | Crick et al. ........................ 713/1 |
| 5,682,553 | A | * | 10/1997 | Osborne ........................ 710/56 |
| 6,246,680 | B1 | * | 6/2001 | Muller et al. ................. 370/389 |
| 6,728,908 | B1 | * | 4/2004 | Fukuhara et al. ............... 714/48 |
| 6,940,666 | B2 | * | 9/2005 | Hanagata et al. ............... 360/15 |
| 7,062,619 | B2 | * | 6/2006 | Dvir et al. ..................... 711/154 |
| 7,246,188 | B2 | * | 7/2007 | Ganasan et al. .............. 710/241 |
| 7,295,639 | B1 | * | 11/2007 | Cory ............................. 375/371 |

* cited by examiner

*Primary Examiner* — David Y Eng
(74) *Attorney, Agent, or Firm* — Lee & Hayes, PLLC

(57) ABSTRACT

Systems and/or methods ("tools") are described that provide a buffer passing mechanism, and other techniques. Some of these tools may be enabled using a computer-implemented data structure that includes a plurality of master buffers, and a plurality of slave buffers that store data elements. Some of the slave buffers are referenced by more than one master buffer. Some of the slave buffers are referenced by one of the master buffers, but not by another master buffer.

10 Claims, 4 Drawing Sheets

BUFFER PASSING MECHANISMS

BACKGROUND

The handling and processing of real-time or streaming media typically involves buffering content, as well as managing multiple different buffers. Assuming, for example, that a real time media system is sending content to two recipients, it is possible to create separate instances or copies of the data in two separate buffers, and to send these two buffers to the respective recipients. These two recipients may then use, modify, and delete their respective buffer as they see fit.

The above approach may be workable in some situations, but suffers shortcomings when applied in other situations. For example, the real time media system, or a buffer management component thereof, typically allocates buffers that are large enough to store the largest foreseeable size of incoming content. This approach seeks to avoid the overhead of creating a first buffer to hold the content, overrunning the first buffer, creating a second, larger buffer, and transferring content to the second buffer. However, this approach may lead to excessive memory usage, since the space allocated within these large buffers will not be fully utilized under most circumstances.

In other scenarios, recipients of the data may wish to perform more complex operations on the data. Also, different recipients may not be interested in only portions of the data. In this case, it is inefficient to provide the entire buffer to such recipients.

SUMMARY

Systems and/or methods ("tools") are described that provide a buffer passing mechanisms, and other techniques. Some of these tools may be enabled using a computer-implemented data structure that includes a plurality of master buffers, and a plurality of slave buffers that store data elements. Some of the slave buffers are referenced by more than one master buffer. Some of the slave buffers are referenced by one of the master buffers, but not by another master buffer.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

Although the emphasis has been on media, this buffer management technique may be used to handle any type of data. For example in a mathematical process, different aspects or portions of the whole data may be placed in different slave buffers.

BRIEF DESCRIPTION OF THE DRAWINGS

The same numbers are used throughout the disclosure and figures to reference like components and features.

DETAILED DESCRIPTION

The following document describes system(s) and/or method(s) ("tools") capable of many powerful techniques, which enable, in some embodiments, buffer passing mechanisms.

Before describing the tools in detail, the following discussions of exemplary operating environments is provided to assist the reader in understanding one way in which various inventive aspects of the tools may be employed. The environment described below constitutes but one example and is not intended to limit application of the tools to any one particular operating environment. Other environments may be used without departing from the spirit and scope of the claimed subject matter.

Figure 1:
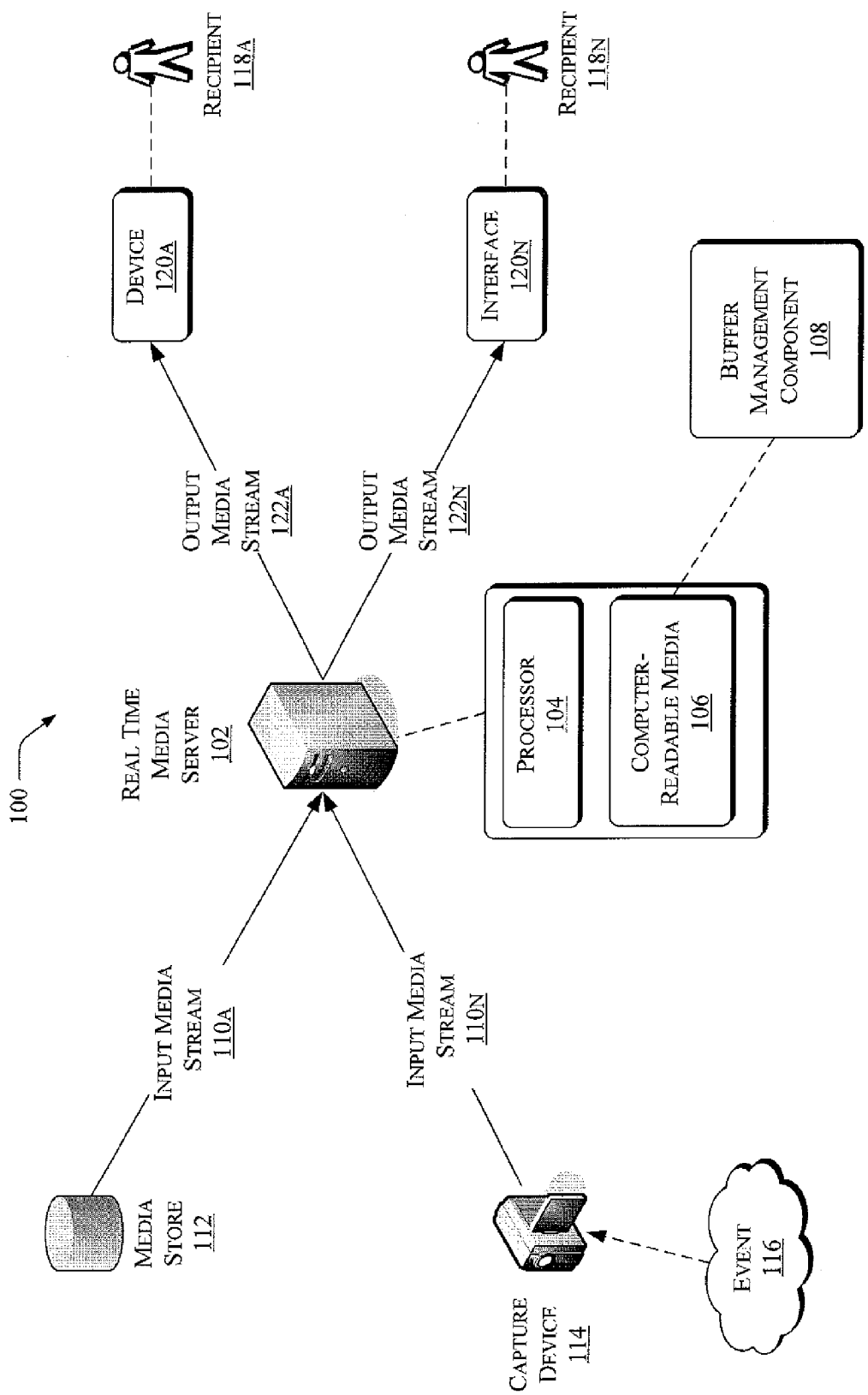
FIG. 1 is a block diagram of an exemplary operating environment for implementing a buffer passing mechanisms.

FIG. 1 illustrates one such operating environment, generally at 100, that includes a real time media server 102. The real time media server may include one or more processors 104 and computer-readable media 106. The processor(s) are capable of accessing and/or executing computer instructions stored on the computer-readable media. The computer-readable media may include one or more buffer management components 108 that embody computer-executable instructions that, when executed, cause a computer-based device or system to perform any of the functions described herein.

The real time media server may receive one or more media streams 110 from one or more sources. For example, but not limitation, FIG. 1 shows two media streams 110A and 110N. However, it is understood that a given media server may receive any number of media streams 110: two media streams are shown in FIG. 1 only for convenience of illustration.

The media stream 110A originates from a media store 112, which may include a suitable mass storage unit into which captured media is loaded for later retrieval and transmission. Thus, the media store may contain pre-recorded media for later playback. The real time media server may receive the media stream 110A from the media store in connection with providing a video-on-demand function, for example.

The media stream 110N originates from a capture device 114, which is for capturing an audio and/or video stream of a live event 116. The capture device 114 may include, but is not limited to, a video camera, microphone, webcam, audio recorder, or any combination of the foregoing. The event 116 may be, for example, a live event such as, but not limited to, a meeting, a conference, a presentation, a sporting event, or the like.

The media server 102 may process the streams 110 as appropriate for transmission to one or more recipients 118. Two recipients 118A and 118N are shown, for convenience only, in FIG. 1. In some implementations, the recipients 118 may be human users. In other implementations, the recipients may be machines that, in turn, further process streams. The recipients 118 may be remote from the media server, such that the recipients communicate with the media server over one or more suitable networks (not shown in FIG. 1).

The recipients may be associated with respective receiving devices 120A and 120N. These receiving devices 120 may include any hardware and/or software suitable for processing the media content for presentation, and for presenting the media content. Examples of the receiving devices may include personal computers, whether desktop, laptop, or handheld, personal digital assistants (PDAs), mobile telephones, gaming devices, or the like.

Output media streams as sent to the recipients 118A and 118N are denoted, respectively, at 122A and 122N (collectively, output streams 122). The output streams may result from processing performed by the media server 102 on the input streams 110. More specifically, the media server may encode the input streams to result in the output streams, or may compress the input streams to result in the output streams. The media server may also reorder, replace, or perform other related operations on data elements contained in the streams, such as packets.

The media server may perform different types of, for example, encoding and/or compression operations depending on which recipient 118 is receiving a given stream, depending on the capabilities or characteristics of particular receiving devices 120, depending on the capabilities of any network connecting the media server to the recipients.

In connection with the foregoing example processing, or with other processing as well, the media server may maintain and manage one or more buffers for storing the input streams and/or output streams during this processing. For convenience, but not limitation, the buffer management component 108 may be understood to perform these functions. Example structures and relationships of buffers managed by the buffer management component are now presented in FIG. 2.

Figure 2:
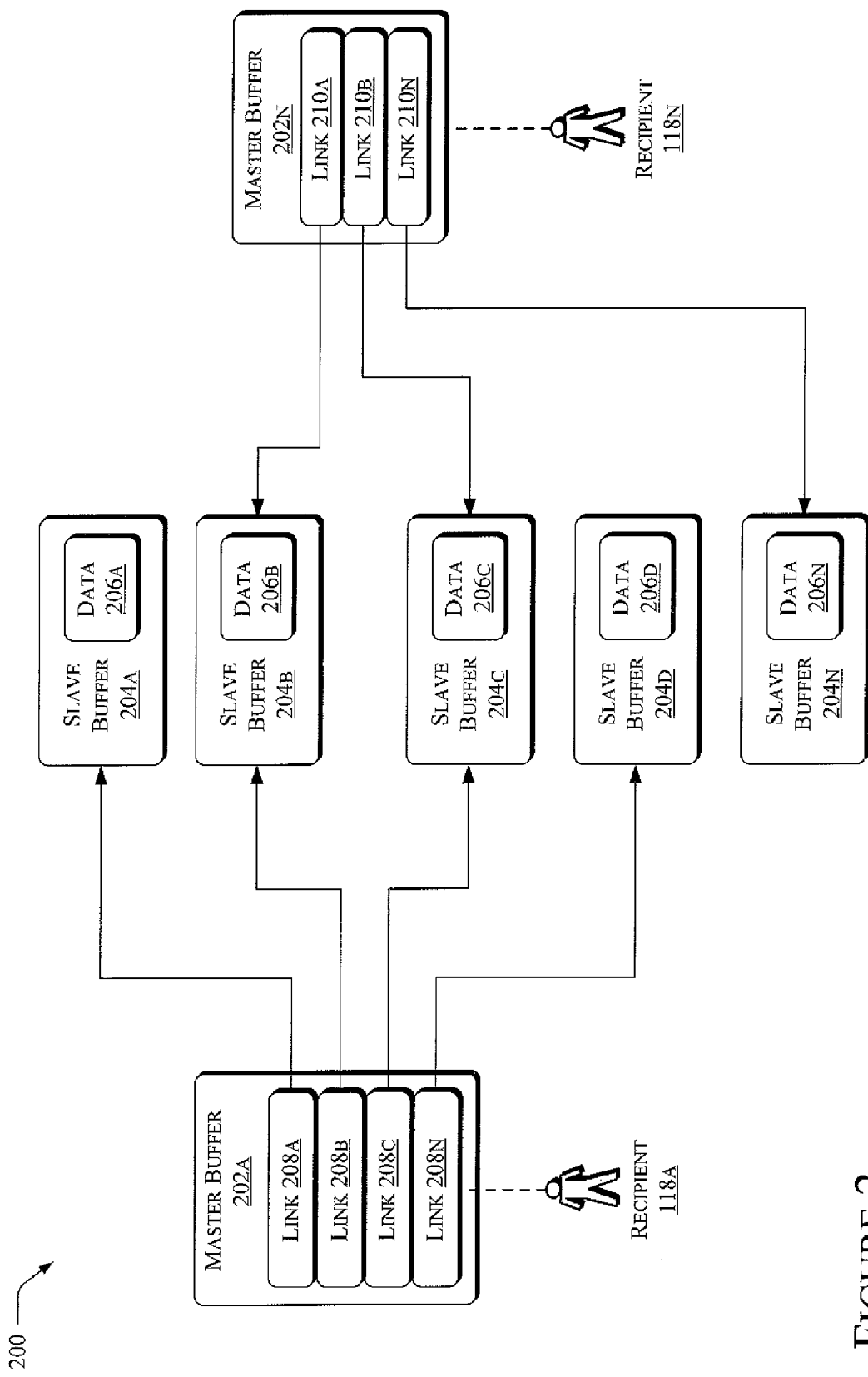
FIG. 2 is a block diagram illustrating relationships among master buffers and slave buffers in providing the buffer passing mechanisms.

FIG. 2 illustrates a data structure 200 supported by the buffer management component for establishing or defining relationships among one or more master buffers 202 and one or more slave buffers 204 in providing a buffer passing mechanism. A master buffer 202A may be associated with a first recipient 118A, while a master buffer 202B may be associated with a second recipient 118N. More specifically, the master buffer 202A may contain data to be transmitted or otherwise provided to the first recipient 118A, and the master buffer 202N may contain data to be transmitted or otherwise provided to the second recipient 118N. FIG. 2 illustrates two master buffers and corresponding recipients only for convenience of illustration, but implementations of the data structure 200 could support any number of master buffers and corresponding recipients.

As noted above, the master buffers 202 may be loaded for the different recipients based on a number of factors. For example, different recipients may have interest in only certain types of data. In this circumstance, only data that is of interest to a given recipient is loaded into that recipient's master buffer, or into a slave buffer associated with that master buffer. For example, a given master buffer may contain N slave buffers and given modules X and Y could receive the "bundle" of buffers, including the master buffer and all N slave buffers. Module X may use only 1 or more of its slave buffers, whereas module Y might be interested in a different subset of buffers.

Additionally, slave buffers may be added or removed along a execution path that the master buffers follows, because some slave buffers may be considered as not useable anymore for any subsequently-created modules. Also, new slave buffers may also be added during the execution path. In any event, the master buffer provides a constant point of association for the entire execution path, with the slave buffers being allocated and de-allocated as appropriate as the execution proceeds.

Finally, different recipients may be associated with devices 120 and/or connecting networks having different types or different capabilities. Accordingly, the media server may process the data transmitted to these recipients differently, and the master buffers may contain the results of such specialized processing for each recipient.

For convenience only, FIG. 2 shows five slave buffers 204, denoted at 204A, 204B, 204C, 204D, and 204N. However, it is noted that the data structure could contain any number of slave buffers 204.

The slave buffers 204 contain respective data elements 206. As shown, the slave buffers 204A-204N contain respective data elements 206A-206N. The data elements 206 may be, for example, packets defined to transmit the input streams 110 and/or the output streams 122. In this packet example, the various slave buffers may be allocated to have a size appropriate for the size or sizes of the packets.

In the FIG. 2 implementation, assume that the recipient 118A is interested in the four data elements 206A-206D, which are contained, respectively, in slave buffers 204A-204D. To provide the recipient 118A with access to these data elements, the master buffer 202A may associate itself to the slave buffers 204A-204D. Put differently, the master buffer 202A may bind the slave buffers 204A-204D to it.

In but one possible implementation, a set of link elements 208 may associate or bind the master buffer and the slave buffers. For convenience only, FIG. 2 shows four link elements 208A, 208B, 208C, and 208N, which are respectively associated with the slave buffers 204A-204D. However, it is understood that implementations could include any number of slave buffers of interest to the master buffer, with the number of link elements corresponding to the number of slave buffers of interest. In different possible implementations, the link elements 208 may include any data structures suitable for associating, grouping or bundling the master buffers and slave buffers. For example, the link elements may include pointers, tables, linked lists, or the like.

The link elements 208 may include, for example, a beginning address associated with a corresponding slave buffer. If the slave buffers are fixed-length buffers, then the link elements 208 may specify these lengths. If the slave buffers are variable-length buffers terminated by a character or element (e.g., a null character), then the link elements 208 may specify these pre-defined characters or elements. Alternatively, these pre-defined characters or elements may be specified elsewhere, or otherwise understood.

In the foregoing manner, the master buffer 202A may be defined to include or refer to the data elements 206A-206D contained in the slave buffers 204A-204D. The recipient 118 or related device may access and operate on these data elements 206A-206D by interacting with the master buffer 202A.

The master buffer 202N may refer to those data elements 206 that are of interest or relevance to the recipient 118N. Assume, for example, that the recipient 118N is interested in the data elements 206B and 206C, which are contained, respectively, in slave buffers 204B and 204C. Accordingly, the master buffer 202N may include link elements 210A and 210B (collectively, link elements 210), which link the master buffer 202N to the slave buffers 204B and 204C, respectively. The above description of the link elements 208 applies equally to the link elements 210.

Assume that the recipient 118N is also interested in a data element 206N. In this instance, another slave buffer 204N may be allocated for this data element 206N, and a link element 210N may be added to the master buffer 202N to refer to this slave buffer 204N.

In this manner, the data elements 206B and 206C and the slave buffers 204B and 204C may be shared between the recipients 118A and 118N, through the link elements contained in the two master buffers 202A and 202N. Note also that the data elements 206B and 206C are shared without duplication. That is, the data elements 206B and 206C are not copied and distributed separately to the recipients 118A and 118N. Thus, the data structure reduces overall memory usage by avoiding this type of duplication.

It is also noted that the master buffers 202 do not refer to data elements that are not of interest or relevance. Thus, the master buffer 202A does not refer to slave buffer 204N, and the master buffer 202N does not refer to the slave buffers 204A and 204D. Put differently, these slave buffers 204A, 204D, and 204N are non-shared.

The data structure 200 allows the buffer management component to manage these non-shared slave buffers with a greater degree of granularity, as compared with previous approaches. For example, once the master buffer 202A no longer needs the slave buffers 204A and 204D, the buffer management component may safely deallocate these slave buffers, returning their memory to the available pool of memory (or heap) that much sooner. Likewise, once the master buffer 202N no longer needs the slave buffer 204N, the buffer management component may safely deallocate the slave buffer 204N, returning memory to the heap sooner as well. In this manner, the buffer management component and related data structures may deallocate unused memory sooner and return it to the heap, where it may be reallocated more quickly to other processes.

In any event, the master buffers 202 may be presented to the recipients as a single unit, such that the recipients interact with the master buffers as single, unitary entities. The master buffers may hide the details of managing and accessing the slave buffers 204 from the recipients. Thus, the master buffers provide a level of abstraction between the recipients and the slave buffers, as now described further with several examples in FIG. 3.

Figure 3:
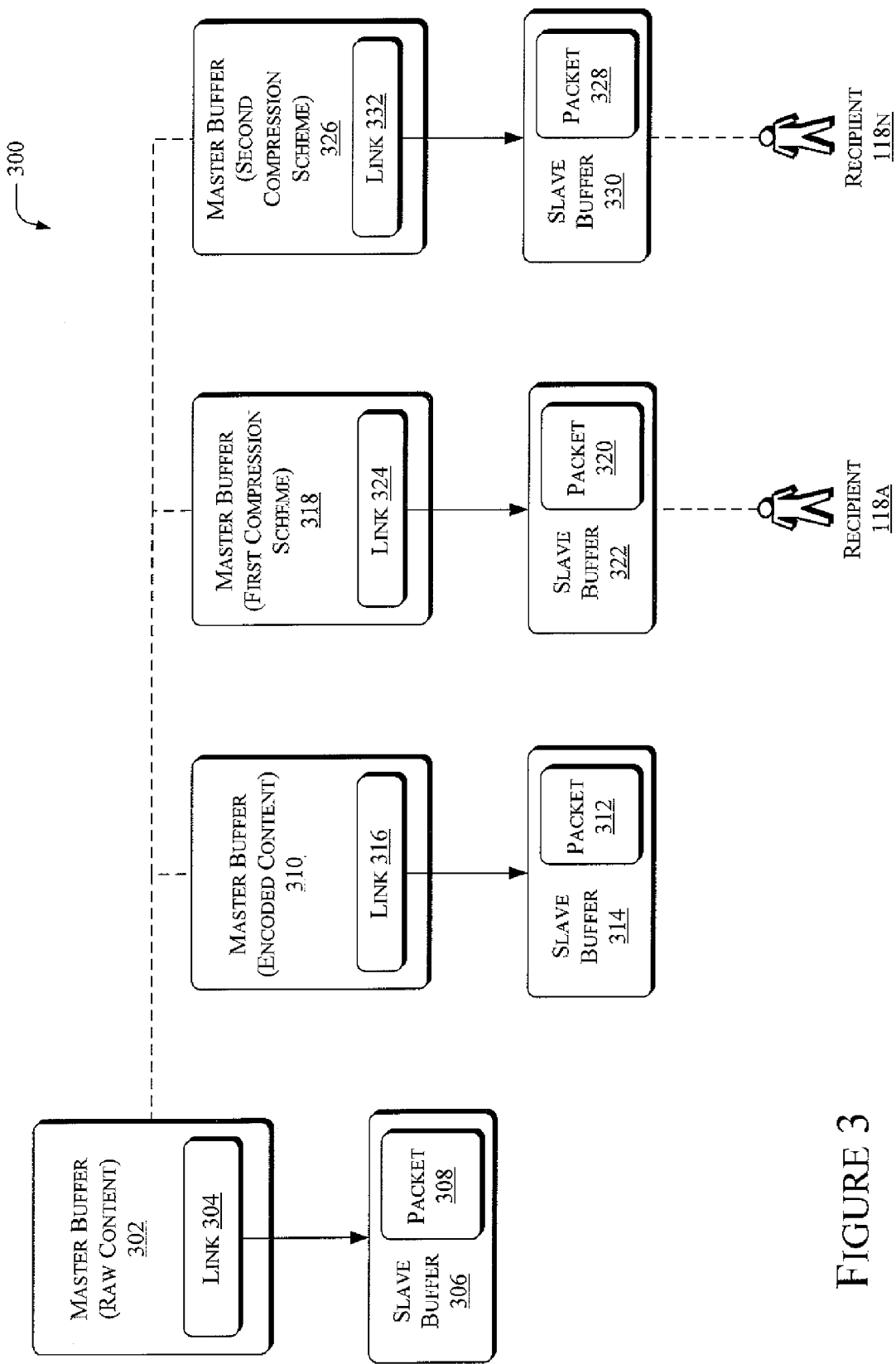
FIG. 3 is a block diagram illustrating different types of master buffers and corresponding slave buffers.

FIG. 3 illustrates a data structure 300 that may be maintained by the buffer management component. The data structure may contain different types of master buffers and corresponding slave buffers. In the illustrated implementation, a master buffer 302 is associated with raw or unprocessed content, which may be received from the capture device 114 or the media store 112. The master buffer 302 may include a link element 304 that references one or more slave buffers 306. The slave buffer 306 contains a data element 308, which may include a packet, for example. As additional raw packets arrive from, e.g., the capture device or the media store, the master buffer 302 may allocate additional slave buffers 306 for these new packets, and reference these new slave buffers with appropriate link elements 304. FIG. 3 shows one master buffer 302, link element 304, slave buffer 306, and data element 308 only for clarity and ease of illustration.

As noted above, the media server 102 may process new packets arriving in input streams 110 in various ways to produce output streams 122. FIG. 3 shows example processes of encoding data packets, compressing data packets using a first different compression scheme, and compressing data packets using a second different compression scheme.

Turning first to encoding, a master buffer 310 may be associated with encoded data packets. As the media server produces encoded packets 312, the master buffer 310 may allocate slave buffers 314 for these encoded packets. The master buffer 310 may also define respective link elements 316 to refer to these slave buffers. If entities, such as recipients 118 or devices 120, request access to the encoded packets 312, the buffer management component may establish appropriate master buffers for these requesting entities. The buffer management component may also include suitable link elements in these new master buffers that point to the slave buffer 314.

Turning to the two compression schemes, assume that the recipients 118A and 118N are associated with different devices 120 and/or different networks, such that different compression schemes are appropriate when transmitting the output streams 122 to the recipients. Accordingly, the media server compresses input packets using these different compression schemes, producing two different sets of compressed packets.

For the first compression scheme, a master buffer 318 may be associated with packets 320 compressed using the first compression scheme. As these packets 320 become available from the media server, the buffer management component may allocate slave buffers 322 to store the packets 320. The master buffer 318 may also include link elements 324 that refer to the slave buffers 322. The master buffer 318 may then be made available to the recipient 118A, who may access the packets 320 using the master buffer 318. An extension to this example could be to have the raw non encoded data be shared by the 2 master buffers, but each master buffer have a slave buffer, which is not shared, with the data encoded in a format that is particular to their own recipient.

Similarly, for the second compression scheme, a master buffer 326 may be associated with packets 328 compressed using the second compression scheme. As these packets 328 become available from the media server, the buffer management component may allocate slave buffers 330 to store the packets 328. The master buffer 326 may also include link elements 332 that refer to the slave buffers 330. The master buffer 326 may then be made available to the recipient 118N, who may access the packets 328 using the master buffer 326.

The above description of the link elements 208 and 210 apply equally to the link elements 304, 316, 324, and 332 shown in FIG. 3 and described above.

While the slave buffers 322 and 330 are discussed in an example pertaining to different compression schemes, implementations of these slave buffers could also support different data encoding schemes, formats, or similar techniques that are tailored for particular recipients 118.

Additionally, a master buffer may serve to maintain different versions of the same data and/or logically related data as a single, addressable unit. The mechanism described herein may also relate data in slave buffers that before was completely unrelated, by, for example, bundling this data with a given master buffer. In this manner, the data in the slave buffers may become logically related to one another.

In other examples, both encoded and non-encoded data in respective slave buffers may be shared with one or more software modules. In turn, these software modules may add other logically-related slave buffers. For example, a given slave buffer may contain statistics compiled based on the non-encoded data.

Figure 4:
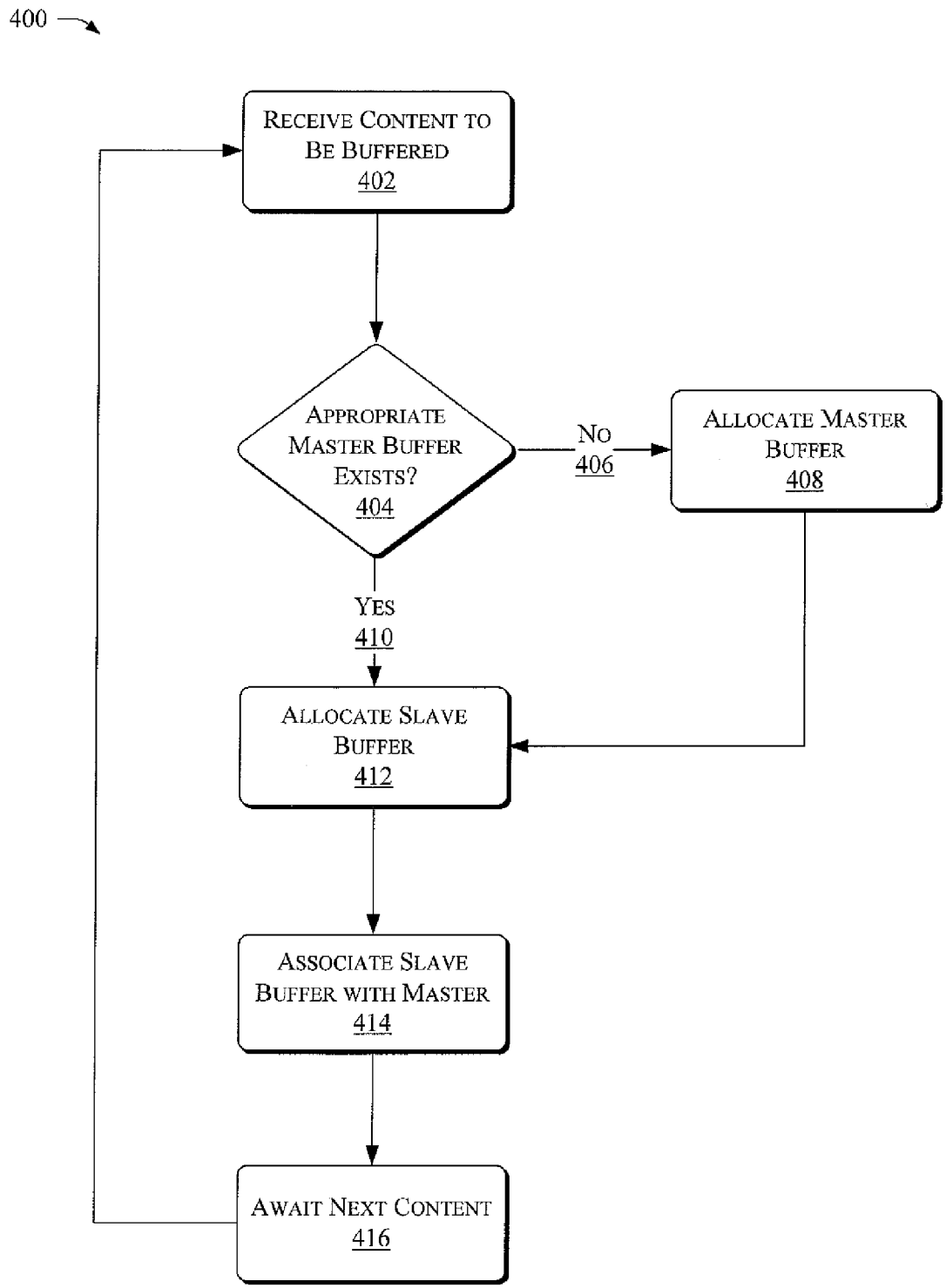
FIG. 4 is a flow diagram of an illustrative process for buffering content into master and slave buffers as described herein.

FIG. 4 is a flow diagram of an illustrative process for buffering content into master and slave buffers as described herein. The process flow 400 may be performed, for example, by a buffer management component, such as the buffer management component 108 shown in FIG. 1 and described herein. However, it is noted that the process flow 400 may be performed, in whole or in part, by other components and in other systems without departing from the scope and spirit of the description herein.

Action block 402 represents receiving content to be buffered. As described above in FIG. 3, this content may be raw content, encoded content, compressed content, or other types of content. More particularly, block 402 may include receiving new content from the input streams 110 shown in FIG. 1. Block 402 may also include receiving content that has been processed by the media server (e.g., encoded, decoded, compressed, or the like).

Decision block 404 represents determining whether an appropriate master buffer already exists for the content received in block 402. For example, FIG. 3 illustrates a master buffer 302 for raw content, a master buffer 310 for encoded content, a master buffer 318 for content compressed according to a first compression scheme, and a master buffer 326 for content compressed according to a second compression scheme. In this example, block 404 may include determining what type of content was received in block 402, and whether a master buffer for that type of content has already been established. In some implementations, the master buffers may be generic, and the slave buffers may be specialized for particular types of data. In other implementations, the master buffers may be specialized for different purposes, and these master buffers may or may not share particular slave buffers.

From block 404, if a master buffer for the type of content received in block 402 does not already exist, then the process flow 400 takes No branch 406 to action block 408. Action block 408 creates an appropriate master buffer.

From block 404, if a master buffer for the type of content received in block 402 does already exist, then the process flow 400 takes Yes branch 412 to action block 412. The process flow 400 may also reach block 412 after performing block 408.

Action block 412 represents allocating a new slave buffer to store the content received in block 402. Various examples of slave buffers are shown in FIG. 2 (e.g., at 204) and in FIG. 3 (e.g., 306, 314, 322, and 330).

Action block 414 represents associating the slave buffer created in block 412 with a master buffer. For example, block 414 may include creating link elements such as those shown in FIG. 2 (at 208 and 210) and in FIG. 3 (at 304, 316, 324, and 332).

Action block 416 represents a wait state, in which the process flow 400 awaits the arrival of new content. When new content arrives, the process flow returns to block 402.

As the process flow is repeated for newly-arrived content, a plurality of slave buffers may become associated with a given master buffer. Additionally, a plurality of master buffers may be associated with respective types of the content. As noted above, in some implementations, the master buffers may be specialized and associated with respective types of slave buffer. In other implementations, the master buffer may be generic, with the slave buffers being specialized. In these latter implementations, the master serves to associate all of the "related" slave buffers together and to allow them to flow or otherwise be handled as a single unit. In turn, these different types of master buffers may be associated with one or more slave buffers, as content of that type arrives.

Master buffers of different types may be defined and allocated dynamically as the types of arriving content changes. Additionally, the master buffers enable dynamic management of their slave buffers, as different types of content arrive and as the slave buffers are used or not used. In this manner, the master buffers enable construction of complex data structures in an arbitrary fashion, depending on how the content arrives.

CONCLUSION

The above-described systems, data structures, and methods enable buffer passing mechanisms. These and other techniques described herein may provide significant improvements over the current state of the art, potentially providing reduced memory consumption, and more efficient use of memory. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the subject matter claimed herein.

The invention claimed is:

1. An apparatus that transmits media content to one or more receiving devices, the apparatus comprising:
    a processor;
    a first master buffer associated with a first receiving device, the first master buffer configured to compress the media content according to a first compression scheme;
    a second master buffer associated with a second receiving device, the second master buffer configured to compress the media content according to a second compression scheme;
    a plurality of slave buffers to store corresponding packets of the media content;
    a buffer management component comprising computer-executable instructions executable by the processor to:
        receive the packets of the media content to be buffered;
        determine whether one of the first and second master buffers has been established for the packets of the media content;
        allocate at least one of the plurality of slave buffers to store the packets of the media content based in part on similarity in size of the allocated slave buffer and size of the packets of the media content when the first master buffer has been established for the packets of the media content;
        link the at least one allocated slave buffer with the established first master buffer, the linking comprising associating at least one set of link elements in the established first master buffer comprising one or more of pointers, tables, and linked lists;
        share the at least one allocated slave buffer with the second master buffer by associating at least another set of link elements in the second master buffer comprising one or more of pointers, tables, and linked lists; and
        send at least some of the packets of the media content from the at least one allocated slave buffer to the first receiving device and the second receiving device.

2. The apparatus of claim 1, wherein the at least one allocated slave buffer stores packets of compressed content.

3. The apparatus of claim 1, wherein the received media content is pre-recorded media content.

4. The apparatus of claim 1, wherein the at least one set of link elements and the at least another set of link elements further comprise at least a portion of an address of the at least one allocated slave buffer.

5. A computer-readable media having stored thereon, computer-executable instructions, that when executed by a processor of a real-time media server perform acts comprising:
    compressing media content by a first master buffer according to a first compression scheme;
    compressing the media content by a second master buffer according to a second compression scheme;
    receiving compressed data elements of the media content
    determining whether a master buffer configured with one of the first or second compression schemes already exists for the compressed data elements of the media content;
    allocating a slave buffer to store the compressed data elements of the media content, based in part on similarity in size of the allocated slave buffer and size of the compressed data elements;
    linking the slave buffer with the first or second master buffer with at least one set of link elements in the first or second master buffer comprising one or more of pointers, tables, and linked lists;

sharing the allocated slave buffer with another master buffer configured with another of the first or second compression schemes by associating at least another set of link elements in the another master buffer comprising one or more of pointers, tables, and linked lists; and sending at least some of the compressed data elements of the media content from the slave buffer to a receiving device associated with the first or second master buffer and another receiving device associated with the another master buffer.

6. The computer-readable media of claim 5, further comprising deallocating the slave buffer linked to the first or second master buffer.

7. The computer-readable media of claim 6, further comprising returning memory of the slave buffer to an available pool of memory.

8. The computer-readable media of claim 7, further comprising allocating at least a portion of the memory of the slave buffer to an additional slave buffer in response to receiving new content.

9. The computer-readable media of claim 8, further comprising linking the additional slave buffer to the first or second master buffer.

10. The computer-readable media of claim 5, further comprising encoding the media content.

* * * * *